United States Patent
Perry et al.

[15] 3,681,550
[45] Aug. 1, 1972

[54] MOTOR SWITCH ARRANGEMENT

[72] Inventors: Max W. Perry, Hastings; Norman D. Brockelsby, Grand Island, both of Nebr.

[73] Assignee: Dutton-Lainson Company

[22] Filed: July 30, 1971

[21] Appl. No.: 167,864

Related U.S. Application Data

[63] Continuation of Ser. No. 90,737, Nov. 18, 1970.

[52] U.S. Cl. ................200/155, 310/66, 310/230, 310/241
[51] Int. Cl. .............................................H01h 19/28
[58] Field of Search........310/230, 66, 241, 228, 244, 310/254, 167, 268, 237, 233, 240, 242, 229, 230; 200/157, 155

[56] References Cited

UNITED STATES PATENTS

| | | | |
|---|---|---|---|
| 2,840,672 | 6/1958 | Martin | 200/155 R |
| 2,814,681 | 11/1957 | White | 200/155 R |
| 3,486,056 | 12/1969 | Vuillemont | 310/242 R |
| 3,159,724 | 12/1964 | Parstorfer | 310/240 R |
| 3,532,914 | 10/1970 | Chang | 310/240 R |

*Primary Examiner*—J. D. Miller
*Assistant Examiner*—R. Skudy
*Attorney*—Molinare, Allegretti, Newitt & Witcoff

[57] ABSTRACT

A direct current motor is provided with a switch which may be rotated in opposite directions to control the direction of operation of the motor. Power is supplied to the split ring commutator of the motor by means of spring-biased brushes passing through openings in an insulating plate positioned between the commutator and the brushes. Rotation of the brushes over the surface of the insulating plate will effect a change in the position of the brushes through the openings in the plate and will thus effect a reversal in the operation of the motor.

7 Claims, 8 Drawing Figures

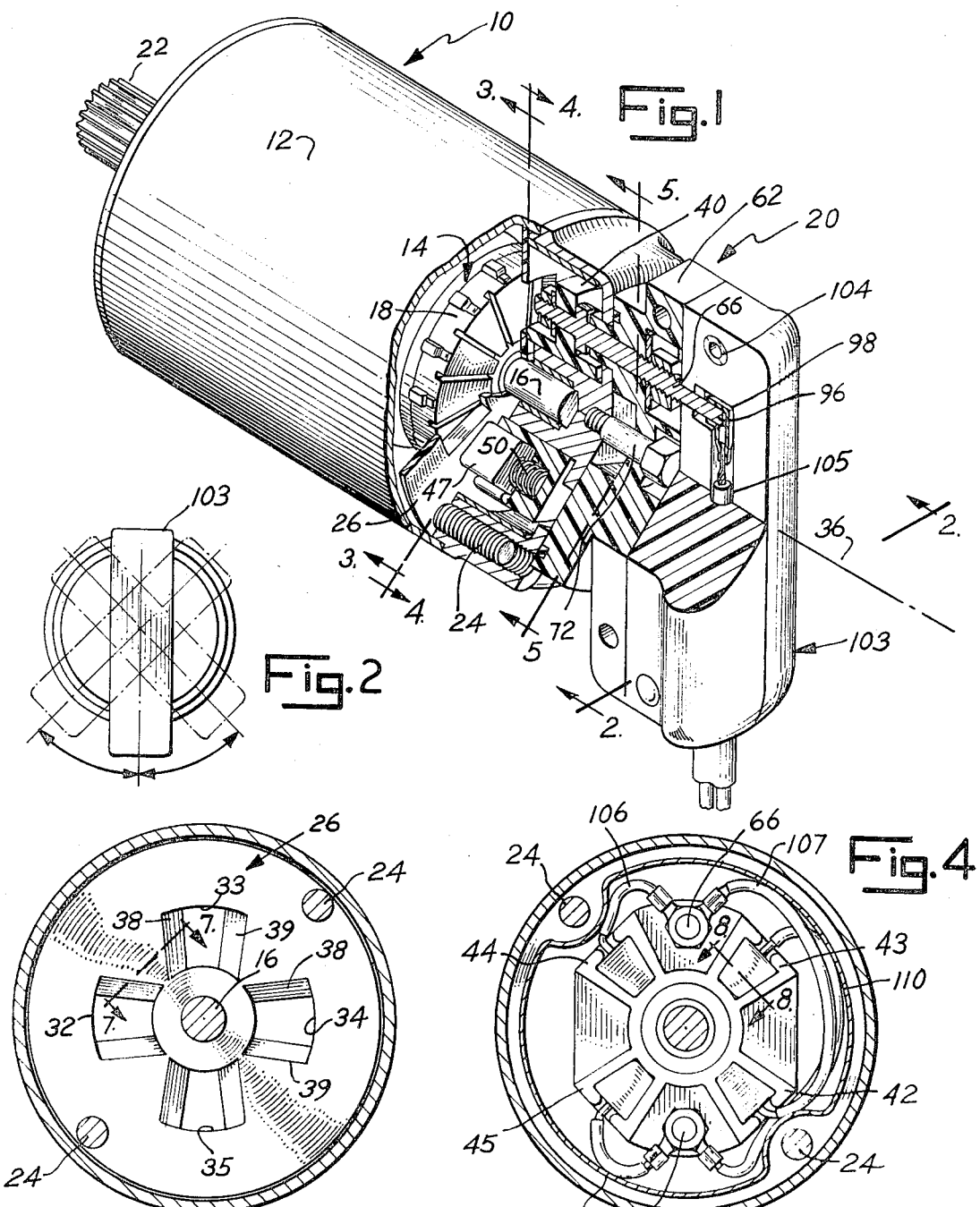

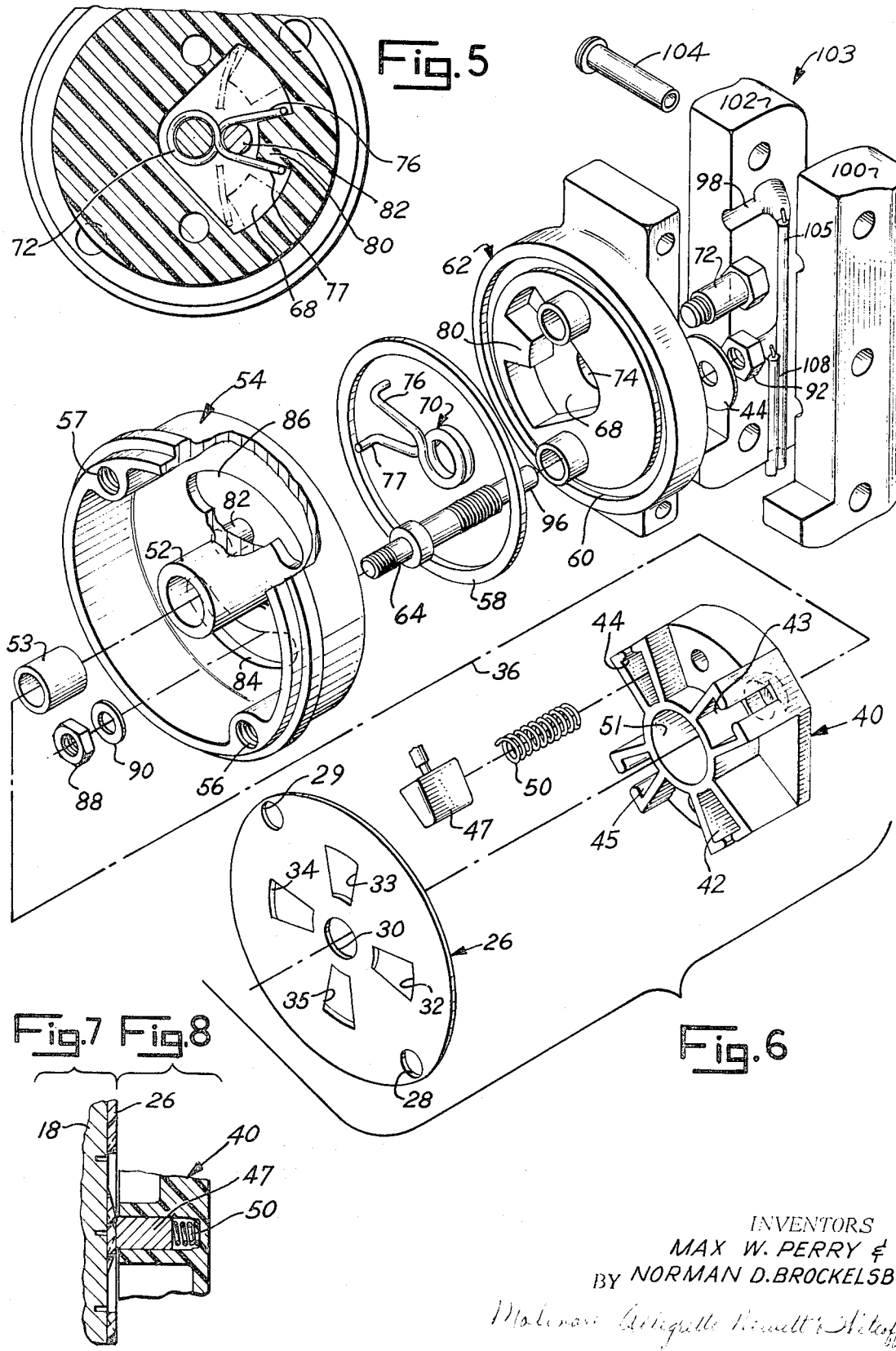

MOTOR SWITCH ARRANGEMENT

This is a continuation of an application, Ser. No. 90,737, now abandoned.

BACKGROUND OF THE INVENTION

This invention relates to switch means for reversing the operation of an electric device and, more particularly, to a reversing switch for a direct current motor.

It is well known in the art of direct current control that a reversal in the connection of wires to a direct current motor will effect a reversal in the operation of that motor. In the past, it has been quite common to provide for reversal in the operation of a d.c. motor by means of a toggle switch or the like which is external to the motor and which operates to reverse current flow to the motor. However, there are applications in which it is desirable to eliminate an external switch. For example, because of the expense of the switch item or for safety reasons, a reversing switch may be incorporated as an integral part of the motor.

SUMMARY OF THE INVENTION

In a principal aspect, the present invention comprises the improvement in a direct current motor of an integral switch which provides for switching the direction of the d.c. motor by altering the connection between the brushes that are in contact with the split ring commutator of the d.c. motor. Thus, a change in polarity of the electric power source of the motor is made. This change is effected by rotating the brushes over the surface of an insulating plate interposed between the commutator and the brushes. The plate includes openings at specified positions which permit the brushes to come into contact with the commutator only when desired.

It is thus an object of the present invention to provide an improved reversing switch for a direct current motor.

It is a further object of the present invention to provide an improved switch capable of changing operation of an electric device from a first mode to a second mode.

One further object of the present invention is to provide a switch capable of reversing operation of an electric device wherein the additional components needed to provide the switch action are minimal.

Still another object of the present invention is to provide a switch mechanism having a simplified and economic construction, yet which is reliable and useful for many operations.

These and other objects, advantages and features of the present invention will be set forth in a detailed description which follows.

BRIEF DESCRIPTION OF THE DRAWINGS

In the detailed description which follows, reference will be made to the drawing comprised of the following FIGS.:

FIG. 1 is a cut-away perspective view of the improved switch mechanism of the present invention;

FIG. 2 is an end view of the switch handle portion of the switch mechanism of the present invention illustrating in phantom the possible switching positions of the switch mechanism;

FIG. 3 is a cross-sectional view illustrating the outside face of the insulating plate of the switch mechanism of the present invention taken substantially along the line 3—3 in FIG. 1;

FIG. 4 is a cross-sectional view of the switch mechanism taken substantially along the line 4—4 in FIG. 1;

FIG. 5 is a cross-sectional view taken substantially along the line 5—5 of FIG. 1;

FIG. 6 is an exploded perspective view of the switch mechanism of the present invention; and FIGS. 7 and 8 are composite cross-sectional views of the insulating plate and brush of the switch of the present invention taken substantially along the line 7—7 in FIG. 3 and 8—8 in FIG. 4 respectively.

DESCRIPTION OF THE PREFERRED EMBODIMENTS

The following detailed description relates to a four pole direct current motor of the type having a split ring commutator and a dead man type switch action wherein the switch handle may be rotated in either of two directions to effect operation of the motor in either of two directions. Upon release of the switch handle, the switch will return to a neutral position. It should be noted, however, that the principles of the specific switch construction to be described below can be applied to other electrical devices wherein a switching action is desired in order to change the operation of the device from a first mode to a second mode.

In particular, the switch mechanism of the present invention is directed to a switch mechanism for changing the mode of operation of the device when the device is of the type which includes a rotating member adapted to receive electric power from contacts which cooperate and engage the rotating member. In the particular description which follows below, the rotating member is the split ring commutator of a four pole dire current motor and the contact means comprise carbon brushes.

Therefore, reference is first directed to FIG. 1. In FIG. 1, a motor 10 is illustrated as having an external motor housing 12 and a rotor 14 having a rotor shaft 16 which defines a centerline axis 36 of the motor 10. The motor 10 is a direct current motor and includes as a stator a pair of semicircular magnets (not shown) on the interior of the motor housing for electrical cooperation with the rotor 14. Attached to the rotor 14 and comprising a part thereof is a split ring commutator 18. A power input and switch assembly 20 for the commutator 18 includes the subject matter of the present invention. Assembly 20 is positioned against the motor housing 12 and adjacent the commutator 18. At the opposite end of the motor 10 of the rotor shaft 16 terminates with an output shaft gear 22. The construction and operation of the stator and rotor as well as the commutator 18 elements of the d.c. motor are all conventional and well known to those skilled in the art. The remainder of the description will therefore be directed to the assembly 20 which includes the subject matter of the invention and which acts as a part of and in cooperation with the d.c. motor 10.

Reference should now be made to FIG. 6 as well as FIG. 1 and collaterally to FIGS. 2 through 5, 7 and 8 for the remainder of the description of the preferred embodiment. Like numbers signify the same component of the device in each FIGURE. A pair of motor housing studs as at 24 extend from the motor housing 12 in a direction parallel to the rotor shaft 16. The stud 24 in FIG. 1 is complemented by a similar stud 180° on the opposite side of the motor housing 12, though not shown in FIG. 1.

An insulating plate or wafer 26 includes stud openings 28 and 29 adapted to fit over the studs as at 24. The plate 26 thus does not rotate in relation to the commutator 18 or the motor housing 12. Plate 26 includes a center rotor shaft opening 30 through which rotor shaft 16 extends. Plate 26 also includes four openings 32, 33, 34 and 35 defined on radii of the plate which are at right angles to each other. The openings 32–35 are of equal size and shape. The openings 32–35 are also positioned at substantially the same distance from a centerline axis 36 of the rotor shaft 16 and plate 26.

The plate 26 is fabricated from an insulating material in order to prevent any electric current flow between an object against one side of the plate and the commutator 18 rotating on the opposite side of the plate 26. As will be seen by reference to FIGS. 3 and 7, the opposite sides of the openings 32–35 are flanked by inclined surfaces 38 and 39, the surfaces 38 and 39 inclined outwardly from a position adjacent the commutator 18 to the opposite side of the plate 26. The inclined surfaces 38 and 39 associated with each of the openings 32–35 and in combination with the surface of plate 26 adjacent the assembly 20 and disposed away from the commutator 18 define a contact or brush path which permits making and breaking electric contact with the commutator 18 to thereby effect a switching operation by the assembly 20.

Adjacent the plate 26 is a brush mounting plate 40 which is mounted for rotation about axis 36 and which includes four brush receptacles 42, 43, 44 and 45. The brush mounting plate 40 is fabricated from an insulating material. Brushes as at 47 fit into each one of the brush receptacles 42–45 and are biased outwardly by a spring 50. This arrangement is also illustrated in FIG. 8.

The brush mounting plate 40 includes a center passage 51 which fits over and is mounted for rotation about an annular ferrule 52 of an end cap 54. The end cap 54 is rigidly held against the motor housing 12 by the studs as at 24 that cooperate with the stud openings 56 and 57 in the end cap 54. A bushing 53 fits within the ferrule 52 and receives the shaft 16 of rotor 14.

A seal and spacer 58 fits in an annular channel 60 of an outer plate 62. The outer plate 62 is rigidly attached to the mounting plate 40 by means of connector pins as at 64 in FIG. 6 and 66 in FIG. 1. Thus, two connector pins 64 and 66 are used not only to maintain the outer plate 62 and the mounting plate 40 in rigid interconnection, but also to serve as the two conducting paths for direct current power to the brushes 47.

The outer plate 62 includes a centering spring recess 68 adapted to receive and cooperate with a centering spring 70. A shoulder screw 72 fits through a center axis opening 74 of outer plate 62 as well as through the coil portion of the spring 70. Screw 72 threads into the end cap 54. The outer plate 62 is thus rotatable about the centerline axis 36 of the assembly 20 and the shoulder screw 72. The spring 70 includes active ends 76 and 77 which cooperate with a lug 80 defined in the recess 68. Also cooperating with the active ends 76 and 77 is projection 82 extending outwardly from the end cap 54. As depicted in FIG. 5, the projection 82 fits between the ends 76 and 77 of the spring 70. The spring 70 thus acts to maintain the outer plate 62 and all the components rigidly attached to that plate in a centered or "dead man" position. FIGS. 2 and 5 illustrate the center position of the outer plate 62 as well as the possible active switch positions which can be provided by rotating the plate 62 in a clockwise or counterclockwise sense.

The connector pins 64 and 66 extend through arcuate slots 84 and 86 in the end cap 54. The connector pins are fastened to the brush mounting plate 40 and also through the outer plate 62 so that the brush mounting plate 40 and outer plate 62 rotate coincidently. A nut 88 and washer 90 serve to attach the connector pins 64 and 66 to the brush mounting plate 40. Similarly, nut 92 and washer 94 serve to connect the pins 64 and 66 with the outer plate 62. Each connector pin 64 and 66 includes a prong 96 which extends beyond the outer plate and into a conducting socket 98 positioned in the matching halves 100 and 102 of a handle 103 formed from an insulating material. Separate lead wires 105 and 108 are provided for sockets 98 and 99 respectively to provide for current input to the switch assembly 20 and ultimately the motor 10. The rivet 104 maintains the handle halves 100 and 102 in an assembled condition.

Referring now to FIGS. 3, 4, 7 and 8, brushes 47 positioned in brush receptacles 42 and 44 are connected to a current source of the same sign through connector pins 66 and leads 106 and 107. In a similar manner, brushes 47 within receptacles 43 and 45 are connected to a current source of the same sign through pin 64 and leads 109 and 110.

The brushes 47 are normally biased against the outer surface of the plate 26 and do not come into contact with the split commutator 18. However, upon turning of the handle assembly against the force of the spring 70, the brushes are caused to slide over the top surface of the plate 26 and down inclined surfaces 38 or 39 and through openings as at 33 to come in contact with the commutator 18. Depending upon the direction of rotation of the handle assembly, brushes 47 connected with connector pin 66 will be made to come in contact with the commutator 18 through the vertically aligned openings 33 and 35 for example. Rotation of the handle assembly by 90° will reverse the current connections to the commutator 18 since brushes 47 connected with pin 66 now extend through openings 32 and 34. Thus, the direction of operation of the motor 10 is reversed.

In the described embodiment, the brushes 47 are normally biased into a nonconducting position. Thus, rotation of 45° in either direction from the center position of the switch handle causes operation of the motor 10 in one sense or the opposite sense. However, it is quite possible for spring 70 to be removed from the assembly in which event the handle assembly may be rotated without being biased back to a nonconducting position. In such an instance the extension of the brushes 47 through various openings 32–35 would tend to maintain the switch in a fixed position, the brushes 47 acting as a detent mechanism when positioned in the openings 32–35.

Advantageously, the switch is an integral part of the motor thus eliminating the need for external switch mechanisms. It follows then that fewer total parts are required. Only a few of the motor components themselves are modified. The addition of the insulating plate 26 having its unique and special construction provides for the many advantages realized by the present invention. Because the brushes 47 are spring loaded, the constant sliding action of the split ring with the brushes maintains the commutator surfaces matched and cleaned with the brushes 47. Very importantly, all available electric energy goes directly to the motor. No energy is dissipated through resistance and heat by switching contacts. This is a very important consideration in direct current motors.

What is claimed is:

1. An improved means for reversing current supply to a split commutator ring of a direct current motor, said ring having a spin axis comprising, in combination, first contact means for connection to electric supply means of one polarity, second contact means for connection to electric supply means of another polarity, a rotatable mounting plate for said contact means, said plate being mounted for rotation about the spin axis of said commutator ring, said plate including means for mounting said contact means and means for maintaining said contact means in substantial contact with said ring, and an insulating plate positioned between said contact means and said ring, said insulating plate including openings for said contact means, said contact means fitting within and through said openings to be in contact with said ring, said openings being separated by contact paths to break the electric connection between said contact means and said ring by rotation of said mounting plate such that a reversing current supply is effected by rotating said contact means from an original position through said openings to a second position through said openings.

2. The improved device of claim 1 wherein said contact means comprise a plurality of brushes biased against said ring.

3. The improved device of claim 1 wherein said rotatable mounting plate is normally maintained by biasing means in a rotatable position with said contact means out of contact with said ring, said plate being rotated against the force of said biasing means whenever said contact means are brought into contact with said ring through said openings.

4. The device of claim 1 wherein said insulating plate includes four openings arranged at substantially 90° intervals at substantially the same radial distance from said spin axis and wherein said contact means comprise four contact means, each contact means adapted to fit through at least two adjacent openings.

5. The device of claim 1 wherein said contact paths of said insulating plate include inclined surfaces tapered from adjacent said ring outward away from said ring.

6. In an electrically powered device having means to provide electric power to said device to operate said device in either of two modes, said means to provide power including first and second contact means for contacting a rotating electrically driven means, the improvement comprising switch means for said contact means to switch said contact means from a first contact position with said driven means to a second contact position with said driven means to change the mode of operation of said device, said switch means including brush means mounted for rotation about an axis, said switch means also including plate means adjacent said brush means, said plate means including openings for said brush means through which said brush means extend for contact with said driven means in said first position, said brush means rotatable about said axis for transfer of said brush means to contact said driven means through said openings in said second position.

7. A motor switch arrangement for operating a motor in at least two modes comprising, in combination:
a commutator for said motor,
contact means for said commutator,
means for providing current to said contact means,
insulation means positioned intermediate said contact means and said commutator, said insulation means including apertures therethrough for said contact means to make electrical connection with said commutator in a first position for operation in one mode and apertures therethrough for said contact means to make electrical connection with said commutator in a second position to operate said motor in another mode, and
means for positioning said contact means through said apertures for said one mode or said another mode.

* * * * *